United States Patent [19]
Huston et al.

[11] Patent Number: 6,148,162
[45] Date of Patent: Nov. 14, 2000

[54] SYSTEM AND METHOD FOR CONTROLLING AN IMAGE TRANSFER DEVICE

[75] Inventors: Craig S. Huston, Escondido; Glenn T. Gentile; Said Zamani-Kord, both of San Diego; Dale R. Davis, Poway; Bruce E. Mortland, Oceanside; Mark Flores, San Diego, all of Calif.; Carmalyn Lubawy, Vancouver, Wash.; Steve Elgee, Portland, Oreg.

[73] Assignee: Hewlett-Packard Company, Palo Alto, Calif.

[21] Appl. No.: 09/328,543

[22] Filed: Jun. 9, 1999

[51] Int. Cl.[7] .................................................. G03G 15/16
[52] U.S. Cl. .......................................... 399/66; 399/389
[58] Field of Search ........................... 399/66, 365, 366, 399/381, 388, 389; 235/462, 494; 358/452, 453; 116/1, 200; 106/31.13, 31.14, 31.15; 347/16

[56] References Cited

U.S. PATENT DOCUMENTS

| | | |
|---|---|---|
| 4,716,438 | 12/1987 | Farrell ........................................... 355/6 |
| 4,739,377 | 4/1988 | Allen ........................................ 399/366 |
| 4,944,031 | 7/1990 | Yoshino et al. .......................... 355/206 |
| 5,051,779 | 9/1991 | Hikawa ..................................... 355/200 |
| 5,426,011 | 6/1995 | Stephenson ................................ 430/22 |
| 5,503,904 | 4/1996 | Yoshinaga et al. ...................... 428/195 |
| 5,506,611 | 4/1996 | Ujita et al. ................................. 347/86 |
| 5,521,674 | 5/1996 | Guillory et al. ......................... 355/200 |
| 5,982,282 | 11/1999 | Ryan, Jr. .............................. 116/200 X |

*Primary Examiner*—Arthur T. Grimley
*Assistant Examiner*—Hoan Tran

[57] ABSTRACT

A system and method for controlling image transfer device operations through use of sensed indicia disposed on at least one edge of the image transfer medium. A signal responsive to the sensed indicia is produced and transferred to a control signal. The control signal is recognizable by the image transfer device for controlling print operations, thereby configuring the device for the specific media being utilized. In a preferred embodiment of the invention indicia are placed on the four edges of the media. The indicia can be in the form of a bar code encoding such information as brand, media type, orientation, and size. Preferably the indicia include nonvisible, fluorescing ink.

21 Claims, 4 Drawing Sheets

SYSTEM AND METHOD FOR CONTROLLING AN IMAGE TRANSFER DEVICE

FIELD OF THE INVENTION

This invention relates in general to image transfer technology and more particularly, to systems and methods of controlling print operations in such devices.

BACKGROUND OF THE INVENTION

In printer device technology, printer operation control commands are generally hard coded into the printer, directly programmed in the printer, or down loaded (programmed) into the printer from a remotely connected computer system. In the case of hard coding, functional variations are usually specific and limited. On the other hand, when directly programming the printer, the operator must know the printer specific control commands and/or must follow a menu format for programming these commands. In the case of down loading commands to the printer, the operator generally controls the printer through specific application programs, or must know specific details about how to program the printer through the downloadable commands.

Although improvements are constantly being made in applications programs to simplify the use of printers, the aforementioned methods, to one degree or another, inhibit some operators in attempts to control the printer. The reason is that, in each of the identified methods, the operator must know something about the printer, its control commands, or the application program controlling the printer.

In view of the foregoing, a need exists for a technique whereby modern printer operations can be controlled efficiently and effectively, while reducing the need for operator input. Solution of the need is complicated since the printer utilizes different print modes according to the media in use. For example, it is desirable that the printer put less ink on a sheet of coated paper than on a sheet of uncoated bond paper. In addition, dry time varies from one media type to another.

U.S. Pat. No. 5,521,674 discloses a novel technique of controlling a printer wherein medium marking material is coded on the surface of media, such as paper. The material is sensed by the printer for control of printer operations. Heat generated during the printing process renders the material non visible. While this technique is useful, it can be limited in cases of full bleed (zero margin) printing since the marking material, in some cases, may react adversely with certain inks. A similar limitation is experienced in cases where marking material is placed on the back side of the media and, in two sided print operations, unwanted reactions occur with the ink.

Accordingly, there is a need for an apparatus and method for controlling a printer wherein the operator would not be required to know specific printer commands nor be required to follow a manual entry menu system for controlling the printer.

In addition, there is a need for a technique for controlling printer operations that functions no matter the orientation of the media and that is useful in full bleed printing. Desirably, such a technique would utilize compositions that are compatible with modern inks, would be suitable for a variety of media and would substantially eliminate a need for operator input. Further, it would be desirable if a method and apparatus for controlling printer operations were inexpensive to implement and functioned whether the media are right side up or properly oriented in the printer.

DISCLOSURE OF THE INVENTION

According to the present invention, there is provided a system and method for controlling image transfer device operations through use of sensed indicia disposed on at least one edge of the image transfer medium. A signal responsive to the sensed indicia is produced and transferred to a control signal. The control signal is recognizable by the image transfer device for controlling print operations, thereby configuring the device for the specific media being utilized.

In a preferred embodiment of the invention, indicia are placed on the four edges of the media. The indicia can be in the form of a bar code encoding such information as brand, media type, orientation, and size. Preferably the indicia include nonvisible, fluorescing ink.

The present invention affords several advantages. For example, the indicia enable full bleed printing on either side of the media without any sacrifice of print quality. In addition, the indicia are detectable in all possible orientations of the media. Thus, the orientation of loaded media is not critical since there is always at least one indicia location readable by the device.

Other aspects and advantages of the present invention will become apparent from the following detailed description, taken in conjunction with the accompanying drawings, illustrating by way of example the principles of the invention.

BEST MODE FOR CARRYING OUT THE INVENTION

Figure 1:
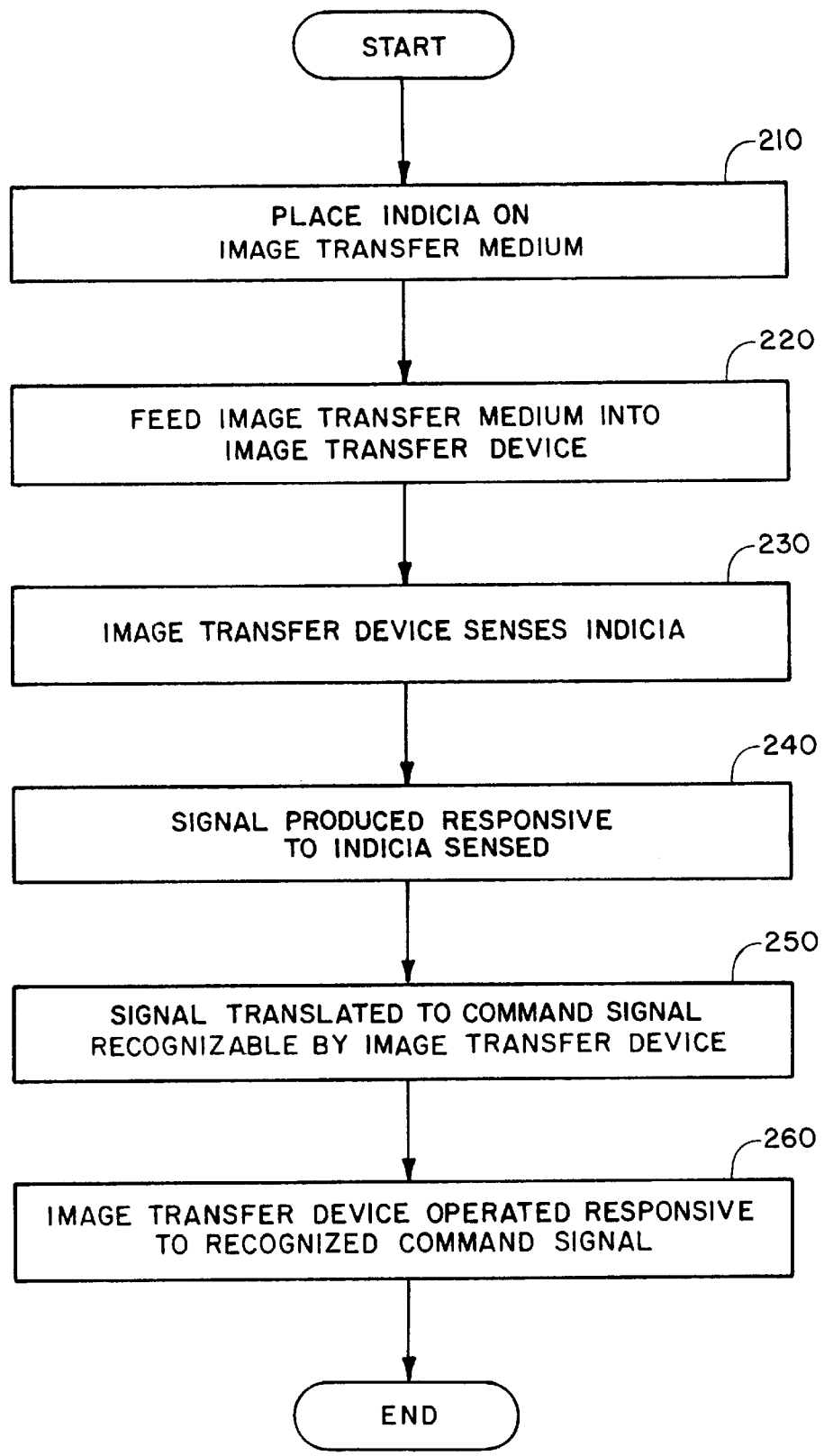
FIG. 1 is a flow chart depicting the present invention method of controlling operations of an image transfer device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In the following detailed description and in the several figures of the drawings, like elements are identified with like reference numerals.

Although the present invention is described in terms of general printer technology, it is obvious to one of ordinary skill in the art that the present invention is equally applicable to other similar forms of image transfer technology including, without limitation, photocopy and facsimile machines and scanners. Accordingly, rather than describing all variations of image transfer technology herein, this discussion will be limited only by the claims relative to image transfer technology in general.

Given the foregoing, FIG. 1 is a flow chart depicting the present invention method of controlling operations of an image transfer device (printer) by using indicia disposed on an edge of an image transfer medium passed through the device. Although the image transfer medium is typically a paper product, such as a sheet of paper, cardstock, or the like, the principles of the present invention are equally applicable to other image transfer media, such as plastic and transparencies. However, for ease of discussion purposes, and rather than referencing all possible variations of image transfer media herein, paper will be referred to as the image transfer medium in this disclosure. It will be understood, further, that conventional single sided print operations, and two sided print operations, are within the purview of the present invention.

As shown in the flow chart at 210, indicia are placed, in a manner more fully discussed below, on or as part of, an image transfer medium (i.e. a sheet of paper). The indicia are preferably nonvisible to the printer operator and are disposed on the paper so as to reduce any likelihood of reaction with ink, even during full bleed print operations. The indicia may be disposed on the paper when the paper is originally manufactured, or through conventional printing operations subsequent to original manufacturing. The manner of placement of the indicia is not crucial to the present invention, so long as the indicia are retained by the paper such that they can be sensed by the printer as described further herein.

Next 220, the indicia containing paper is fed into the printer as conventionally occurs in image transfer operations. Subsequently 230, the printer senses the indicia on the paper. The sensing occurs by conventional image sensing technology as described further herein.

At this point 240, a signal is produced responsive to the indicia sensed, and translated to a printer command signal 250. The command signal is simply a signal that is interpreted by the printer for controlling printing operations. If the command signal is valid, printing operations are properly controlled. If the command signal is not valid (for example, due to incorrect placement of indicia or other error), an error signal results for which printing operations respond accordingly.

At the next step 260, the printer responds to the printer command signal produced. In this regard, printer operations are controlled responsive to the command signal produced from the interpreted indicia on the paper. Since the indicia may contain a variety of coded information, numerous printer commands may be identifiable therefrom. For example, if the indicia are encoded on the paper in a fashion similar to conventional bar coding (and scanning) technology, the number of distinguishably encoded commands is virtually limitless. As such, it will be clear to one of ordinary skill in the art that many printer operations may be controlled according to the method of the present invention. Accordingly, the command signals generated need only correlate to conventional printer commands.

Figure 2:
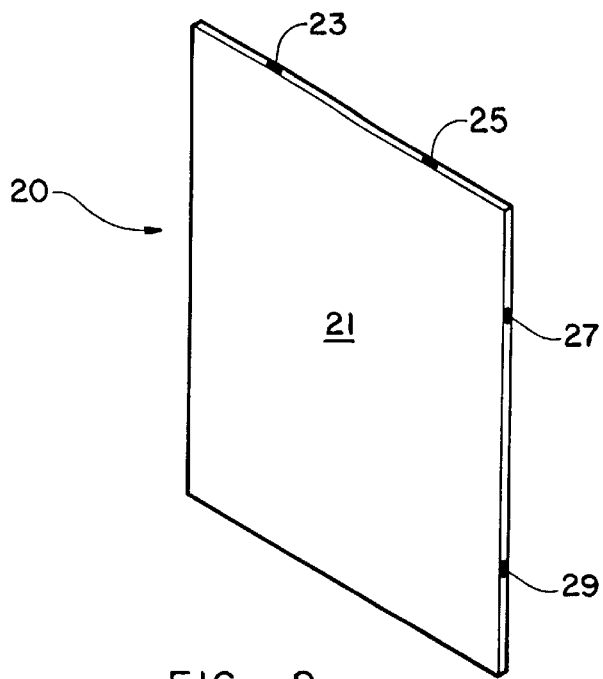
FIG. 2 is a perspective view of a sheet of media containing indicia according to the present invention.

FIG. 2 depicts a sheet of image transfer medium 21 which, for convenience of description, may be regarded as paper. While expressions such as "top side" or "bottom side" are frequently used in describing a sheet of paper, the sheet itself is typically regarded as having virtually no thickness. This is not the case in the present invention and the paper 21 is shown having an exaggerated thickness for illustrative purposes. Thus, when the term "edge" is used herein, it is meant to refer to a side of the paper 21 where indicia, such as the indicia 23, 25, 27 and 29 are disposed.

Figure 3:
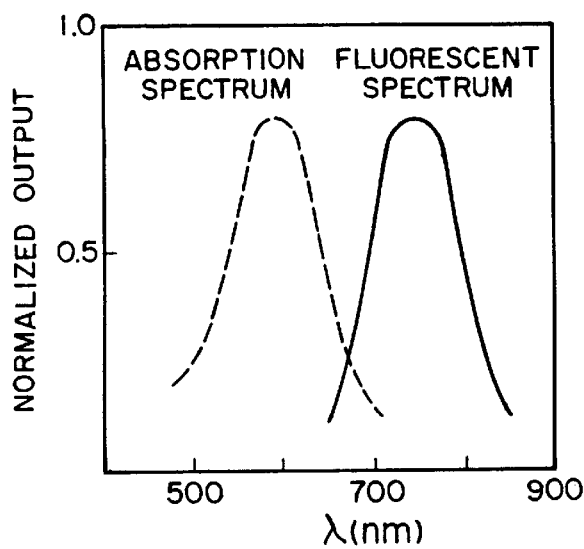
FIG. 3 illustrates the absorption spectrum of preferred ink utilized in the present invention.

While several conventional inks are suitable for use, infrared ink is preferred since it leaves no visible marks on the media. In addition, fluorescing ink having an absorption peak at about 690 nm and fluorescing at about 715 nm (FIG. 3) is preferred. It has been found that fluorescing ink produces a strong signal even when a single sheet of media is being sensed.

Since the indicia are disposed on eight different media locations, it is possible to encode specific information at each location. Thus, by differing the code from one location to another, information such as medium orientation, size and type can be efficiently encoded and readily sensed during printer operation. In the case of rolls of media, a varying code printed along the length of the roll enables length information, and roll orientation, to be encoded.

Figure 4:
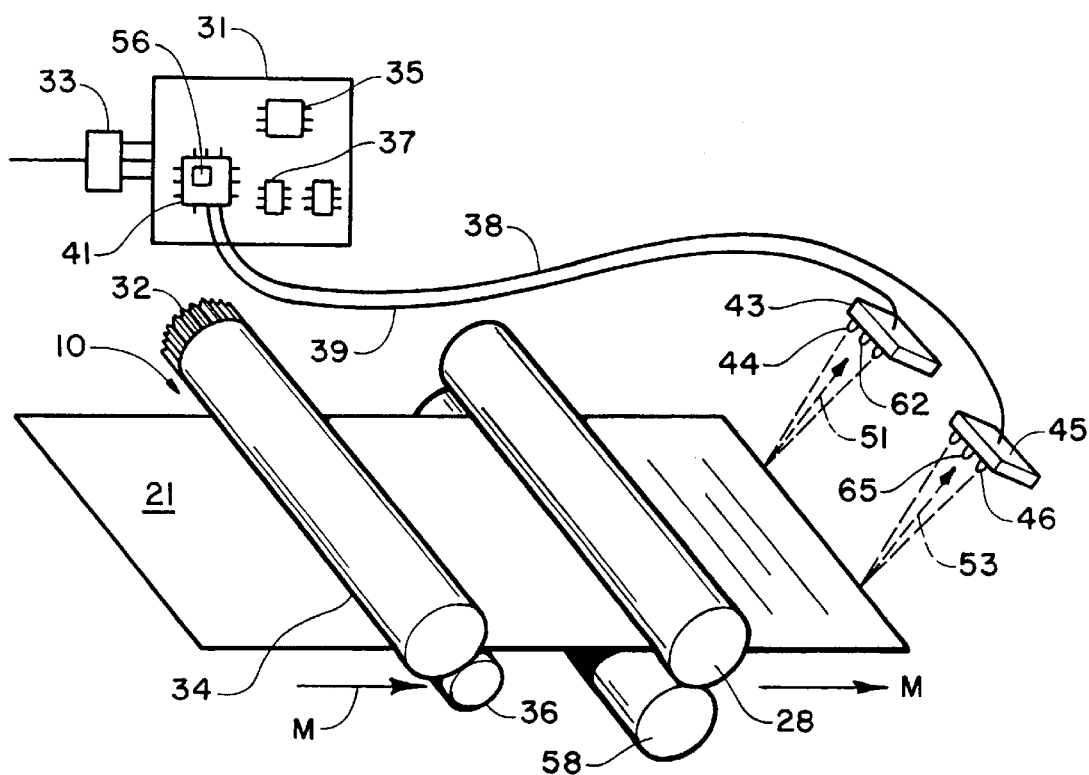
FIG. 4 is a schematic block diagram of a first embodiment of the present invention for controlling operations of an image transfer device.

FIG. 4 is a schematic block diagram of a system of the present invention for controlling operations of an image transfer device 10 responsive to indicia, such as the indicia 23 and 25 sensed on an image transfer medium 21 that is passed through the device. Although the image transfer device 10 depicted is a printer, the present invention is equally applicable to other image transfer technology, as previously discussed.

A printed circuit assembly (PCA) 31 embodies the general formatter electronics for printing an image to paper and includes memory 37, such as Random Access Memory (RAM), for holding an image to be printed, a microprocessor 35 for processing the image to be printed, general circuitry 41, and an input/output (IO) interface 33 for connecting the PCA 31 to separate computing components. Translation circuitry 56 is shown as a separate component from the general circuitry 41 for convenience. However, as conventional in the art, it may be combined or embodied in general ASIC circuitry 41, or kept separate.

A photoconductive, electrically charged drum 34 is provided for holding an image to be transferred (printed) to a transfer roller 22 and subsequently onto the paper 21. A gear drive 32 is connected to the drum 34 and meshes with other gear drive components (not shown) of the laser printer for rotating the drum 34. Fuser rollers 28 and 58 fuse the transferred image to the paper in a conventional manner.

Although a photoconductive drum 34 is shown, a continuous, photoconductive belt (not shown) or other medium of transfer could be conveniently used, in place of the drum 34. In this regard, for example, if the present invention were employed with in jet printer technology, a non photoconductive drum surface may be used.

A conventional optical sensor 43, coupled by a lead 39 to the circuitry 41 is capable of sensing the indicia. In a preferred embodiment, the sensor 43 includes a light source 44 which directs a light 51 upon indicia which are placed on an edge of the paper 21 in a coded form representative of a command or commands for controlling the printer system 10. Indicia 25, for example, may also placed correlative with a sensor 45 for aiding in determining medium orientation and for sensing commands encoded for controlling the printer.

With respect to the sensor 43, as the paper 21 is moved through the printer, in a direction indicated generally by the letter M, light 51 is reflected from the indicia 23 back to a photosensor 62. The photosensor 62 is, preferably, a reflective photosensor, although a transmission type photosensor, phototransistor, photodiode or other light detection device will function similarly. Upon detection of the light 51, the photosensor 62 generates a signal (current) indicative of the light detected. This signal is transmitted to the translation circuitry 56 embodied in the general circuitry 41 of the PCA 31. The translation circuitry is engineered by conventional means in the art and translates the received signal to a printer command signal for controlling printer operations.

One of several conventional printing methods may be used to apply indicia to the edges of the transfer media. For example, a stack of media may be compressed from the top of the stack as a rubber stamp is used to apply the ink to the edges of the stack. Flexographic presses could be modified to apply ink to the edge of a media stack. In a preferred method, an ink jet printer is used to jet ink onto the edges of the stacked media. No matter which application technique is utilized, care must be taken to ensure that the ink is formulated so as to avoid having the sheets in the stack adhere to one another.

Figure 5:
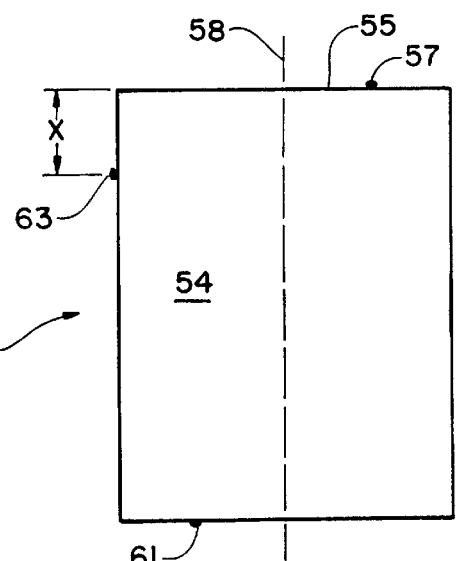
FIG. 5 is a perspective view of another sheet of media containing indicia according to a second embodiment of the present invention.
Figure 6:
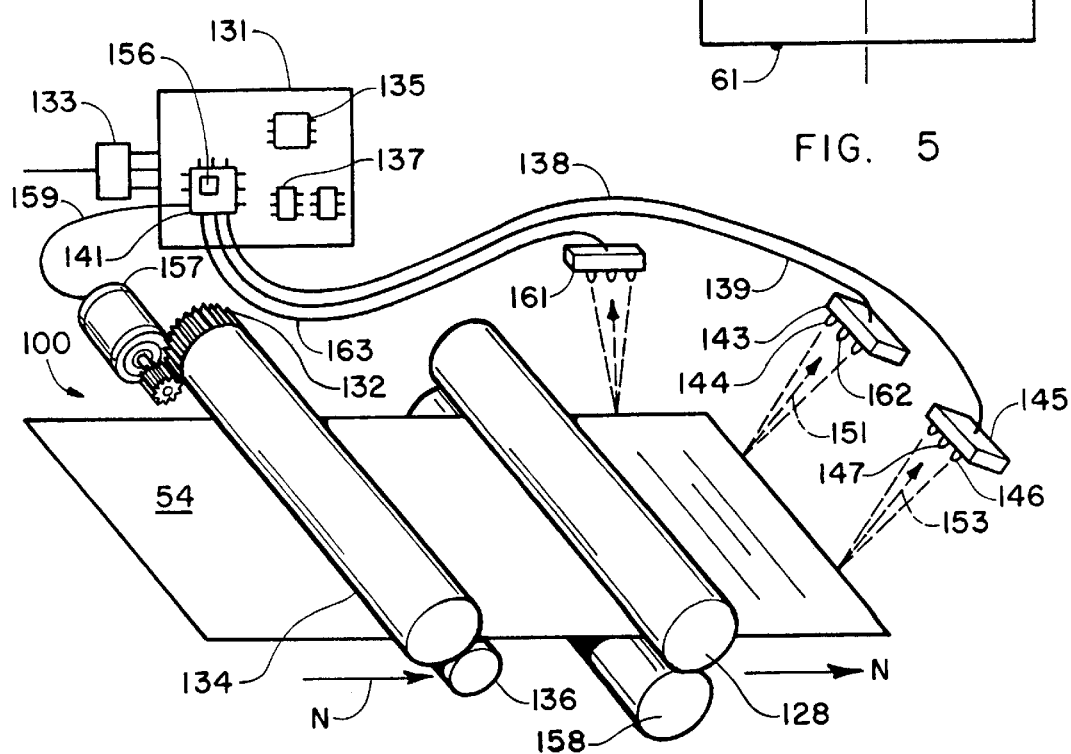
FIG. 6 is a schematic block diagram of a second embodiment of the present invention for controlling the operations of an image transfer device.

Another embodiment of the invention is shown in FIGS. 5 and 6. This embodiment is similar to that shown in FIGS. 2–4 in that it utilizes similar encoded indicia. FIG. 5 depicts a sheet of image transfer medium 50 which, for convenience of description, may be regarded as paper. As in the previously described embodiment, when the term "edge" is used herein, it is meant to refer to a side of a paper 54 where indicia, such as the indicia 57, 61 and 63 are disposed.

When the paper 54 is properly oriented with respect to the printer, a leading edge 55 is provided. Indicia 57 are disposed on the leading edge 55 to the right of an imaginary centerline 58. Sensors 143 and 145 (FIG. 6), similar in structure and function to the sensor 45, scan the paper 54 as it passes through the printer. If the sensor 145 detects the indicia 57, or if the paper 54 is reversed and the indicia 61 are detected, the paper 54 is regarded as properly oriented and the printing operation proceeds. On the other hand, if the sensor 143 detects either indicia 57 or 61, an error signal is generated and the user is instructed to turn the paper 54 over.

FIG. 6 is a schematic block diagram of a system of the present invention for controlling operations of an image transfer device 100 responsive to indicia, such as the indicia 57 and 61 sensed on an image transfer medium, such as the paper 54. The paper 54 is passed through the device 100 in a direction generally indicated by the letter N. Although the image transfer device 100 depicted is a laser printer, the present invention is equally applicable to other image transfer technology, as previously discussed.

A printed circuit assembly (PCA) 131 embodies the general formatter electronics for printing an image to paper and includes memory 137, such as Random Access Memory (RAM), for holding an image to be printed, a microprocessor 135 for processing the image to be printed, general circuitry 141, and an input/output (IO) interface 133 for connecting the PCA 131 to separate computing components. Translation circuitry 156 is shown as a separate component from the general circuitry 141 for convenience. However, as conventional in the art, it may be combined or embodied in general ASIC circuitry 141, or kept separate.

A photoconductive, electrically charged drum 134 is provided for holding an image to be transferred (printed) to a transfer roller 136 and subsequently onto the paper 54. A gear drive 132 is connected to the drum 134 and meshes with the gear drive of a stepper motor 157 for rotating the drum 134. The stepper motor is coupled by a lead 159 to the circuitry 141. Fuser rollers 128 and 158 fuse the transferred image to the paper in a conventional manner.

As in the previously described embodiment, while a photoconductive drum 134 is shown, a continuous, photoconductive belt (not shown) or other medium of transfer could be conveniently used, in place of the drum 134. In this regard, for example, if the present invention were employed with in jet printer technology, a non photoconductive drum surface may be used.

The optical sensor 143 is coupled by a lead 139 to the circuitry 141 and the sensor 145 is similarly coupled by a lead 138. The sensors 143 and 145 are similar in structure and function to the sensors 43 and 45 of the previously described embodiment. The sensors function as described above to detect indicia 57 or 61. In a preferred embodiment, the sensors 143 and 145 each includes a light source 144 and 146, respectively, which directs a light 151 and 153, respectively, upon the indicia placed on the leading edge 55 of the paper 54.

At this point in a printing operation, proper orientation of the paper 54 has been assured and the paper 54 is fed into the device 100. Since it would be desirable to have a technique for adjusting print mode according to media type, a third optical sensor 161, similar in structure and function to the sensors 143 and 145, is provided. The sensor 161 is electrically coupled by a lead 163 to the circuitry 141 and it is positioned to detect indicia, such as the indicia 63 on a lateral edge of the paper 54. The indicia 63 are located at a distance X from the leading edge 55 and the distance can be varied according to media type.

The gear drive 132, controlled by the stepper motor 157 cooperates with the drum 134 in moving the paper 54 forward. During a printing operation, stepper motor steps are counted until the sensor 161 detects the indicia 63. Since the distance X can be varied according to media type, the number of stepper counts vary from one media type to another. In this manner, printer adjustments can be made for various media types by predetermining the stepper counts for a given type.

Figure 7:
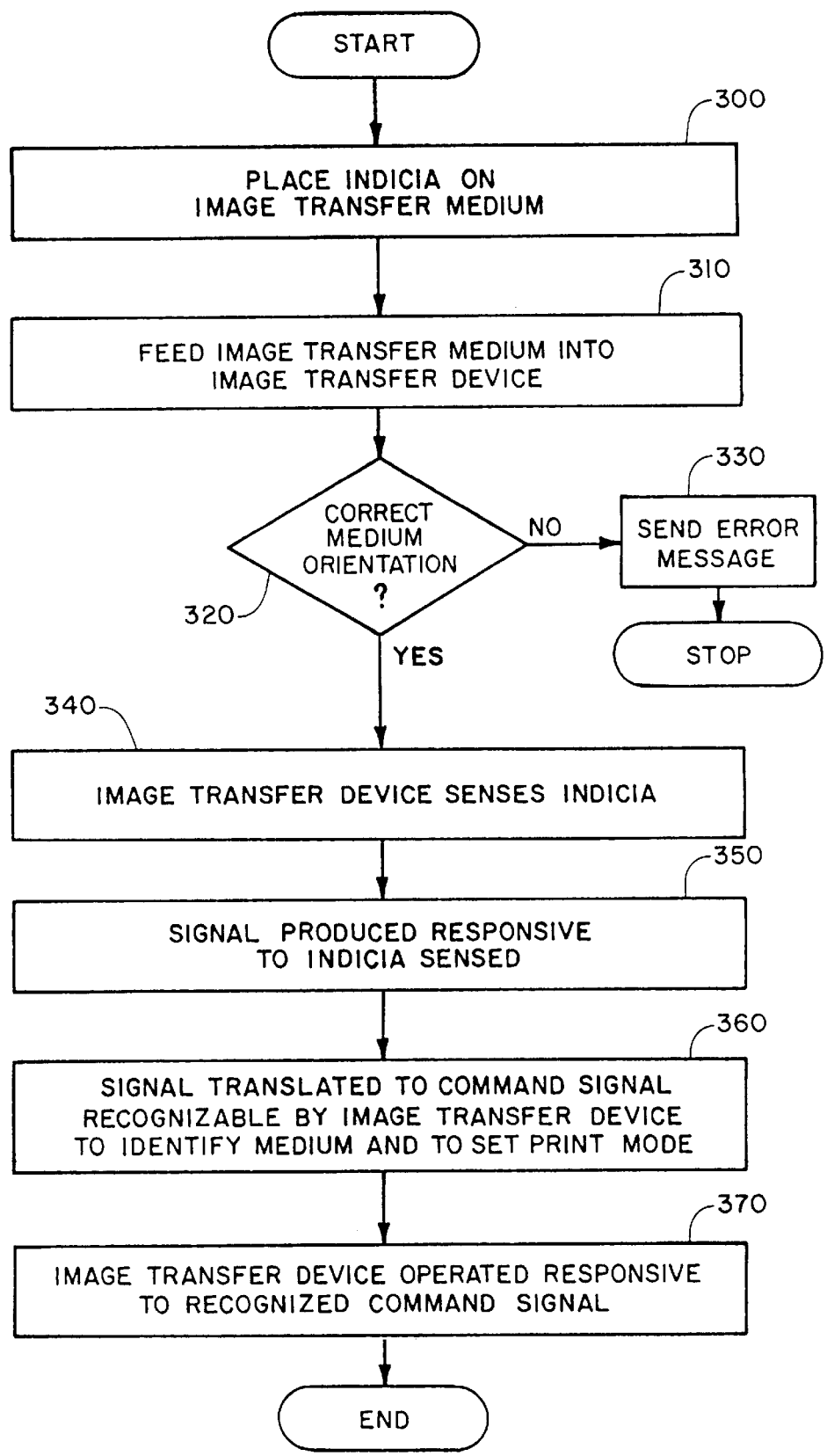
FIG. 7 is a flow chart depicting the present invention method of controlling operations of an image transfer device.

FIG. 7 is a flow chart depicting the method of controlling operations of an image transfer device (printer) as such method is practiced by the embodiment of FIGS. 5 and 6. As in the prior case, although the image transfer medium is typically a paper product, such as a sheet of paper, cardstock, or the like, the principles set forth herein are equally applicable to other image transfer media, such as plastic and transparencies. However, for ease of discussion purposes, and rather than referencing all possible variations of image transfer media herein, paper will be referred to as the image transfer medium in this disclosure. It will be understood, further, that conventional single sided print operations, and two sided print operations, are within the purview of the present invention.

As shown in the flow chart at 300, indicia are placed on an image transfer medium (i.e. a sheet of paper). The indicia are preferably nonvisible to the printer user and are disposed on the paper so as to reduce any likelihood of reaction with ink, even during full bleed print operations. The indicia may be disposed on the paper when the paper is originally manufactured, or through conventional printing operations subsequent to original manufacturing. The manner of placement of the indicia is not crucial to the present invention, so long as the indicia are retained by the paper such that they can be sensed by the printer.

Next 310, the indicia containing paper is fed into the printer as conventionally occurs in image transfer operations. Subsequently 320, a determination is made as to whether or not the transfer medium is correctly oriented. If not 330, an error message is created and the printing operation is stopped. Alternatively, a conventional printing operation, without reference to indicia may be permitted to continue. If, on the other hand, it is determined that the image transfer medium is correctly oriented 340, the printer senses the indicia and determines the type of medium is being used.

At this point 350, a signal is produced responsive to the indicia sensed, and translated to a printer command signal 360. The command signal is simply a signal that is interpreted by the printer for controlling printing operations. At the next step 370 the printer responds to the printer command signal produced. In this regard, printer operations are controlled responsive to the command signal produced from the interpreted indicia on the paper. As in the case of the embodiment of FIGS. 2–4, the indicia may contain a variety of coded information and numerous printer commands may be identifiable therefrom.

From the foregoing it will be appreciated that the system and methods provided by the invention provide an efficient and effective technique for controlling image transfer device operations while minimizing user input. It will be evident that there are additional embodiments and applications which are not disclosed in the detailed description but which clearly fall within the scope of the present invention. The specification is, therefore, intended not to be limiting, and the scope of the invention is to be limited only by the following claims.

What is claimed is:

1. A method of controlling operation of an image transfer device, comprising the steps of:
   providing an image transfer medium, said medium having a top surface, a bottom surface and a plurality of edges integrally disposed between said top surface and said bottom surface, said medium further having signal generating indicia disposed on at least some of said plurality of edges;
   providing an image transfer device having a sensor for detecting a signal generated by said indicia; and
   converting the detected signal into a command signal for controlling image transfer device operation.

2. The method according to claim 1, including the step of providing an image transfer medium having said signal generating indicia disposed on four edges thereof.

3. The method according to claim 1, including the step of providing an image transfer medium having said signal generating indicia disposed on eight edge locations thereof.

4. The method according to claim 1, including the step of providing an image transfer medium having said signal generating indicia disposed in separated relationship on at least one of said plurality of edges.

5. The method according to claim 1, including the step of using a fluorescing ink as the signal generating indicia.

6. The method according to claim 1, including the step of using an infrared ink as the signal generating indicia.

7. The method according to claim 1, including the step of providing an image transfer medium having signal generating indicia in bar code format.

8. A system for controlling operations of an image transfer device, comprising:
   image transfer medium, said medium having a top surface, a bottom surface and a plurality of edges integrally disposed between said top surface and said bottom surface, said medium including signal generating indicia disposed on at least some of said plurality of edges;
   means for sensing a signal generated by said indicia;
   means for producing a control signal responsive to the sensed indicia; and
   means for operating the image transfer device responsive to the control signal.

9. The system according to claim 8, wherein said indicia are disposed on four edges of said image transfer medium.

10. The system according to claim 8, wherein said indicia are disposed on eight edge locations of said image transfer medium.

11. The system according to claim 8, wherein said indicia are disposed in separated relationship on at least one of said plurality of edges on said image transfer medium.

12. The system according to claim 8, wherein said indicia include fluorescing ink.

13. The system according to claim 8, wherein said indicia include an infrared ink.

14. The system according to claim 8, wherein said image transfer device is a printer, photocopier, scanner, or facsimile device.

15. The system according to claim 8, wherein said image transfer medium is paper or plastic.

16. The system according to claim 8, wherein said indicia include material in bar code format.

17. The system according to claim 8, including means for displaying image transfer medium type and orientation.

18. The system according to claim 8, including means, responsive to said control signal, for controlling image transfer device print mode.

19. The system according to claim 8, wherein said means for sensing includes a plurality of sensors.

20. The system according to claim 19, wherein one of said plurality of sensors includes means for sensing distance of travel of said image transfer medium in said image transfer device.

21. The system according to claim 20, including means responsive to said distance measuring means for adjusting image transfer device print mode.

* * * * *